No. 816,114.
PATENTED MAR. 27, 1906
W. J. MORRISON.
CANDY MACHINE.
APPLICATION FILED NOV. 4, 1904.
3 SHEETS—SHEET 1.
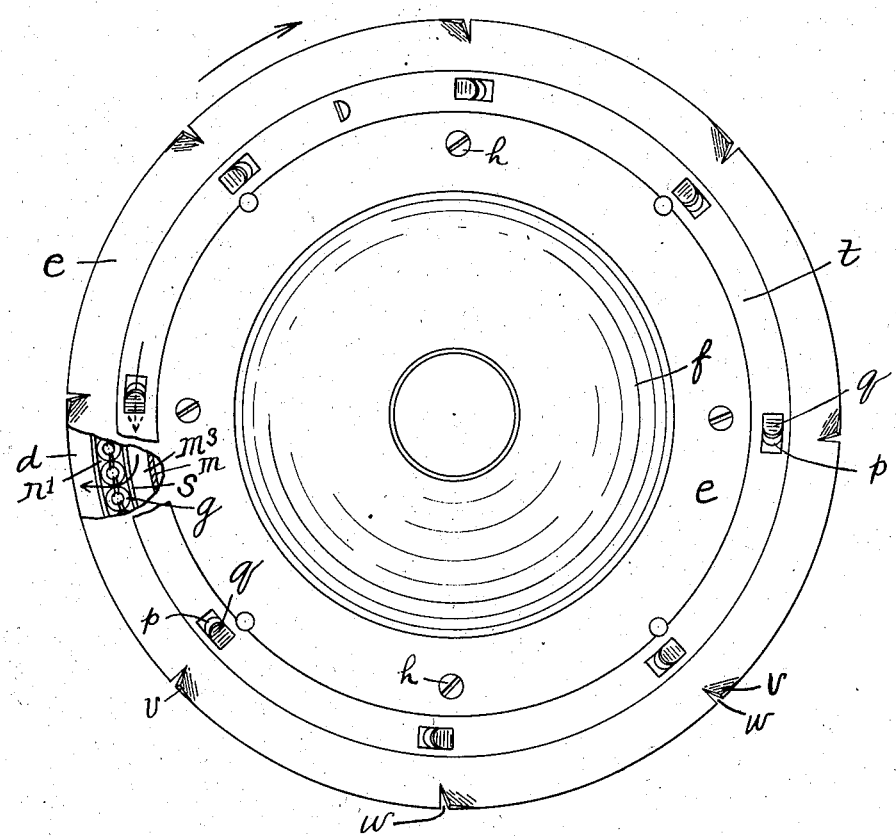
FIG_3_
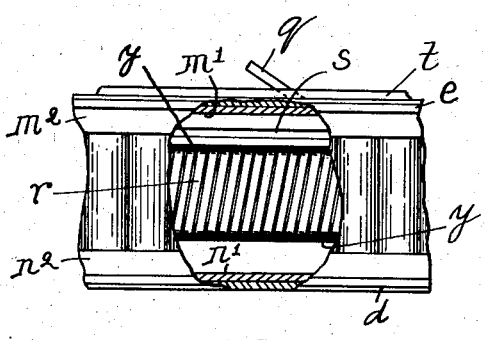
FIG_4_
Witnesses:
H. B. Davis
Maud M. Pipu
Inventor:
Wm. J. Morrison No. 816,114. PATENTED MAR. 27, 1906.
W. J. MORRISON.
CANDY MACHINE.
APPLICATION FILED NOV. 4, 1904.
3 SHEETS—SHEET 3.
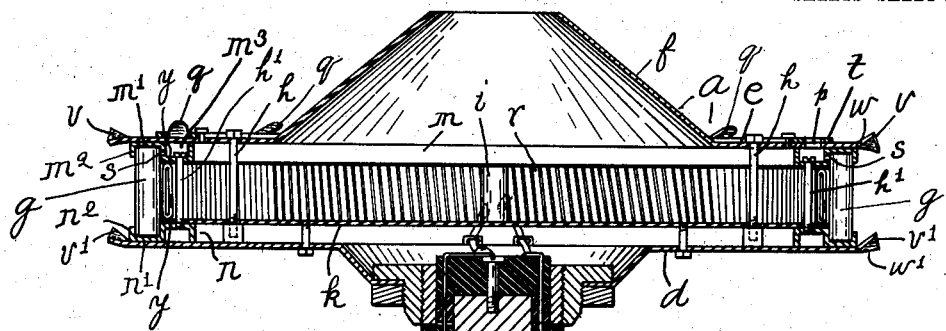
FIG. 5.
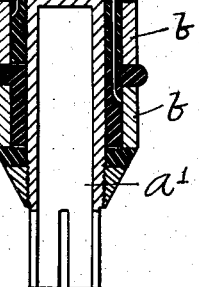
FIG. 6.
FIG. 7.
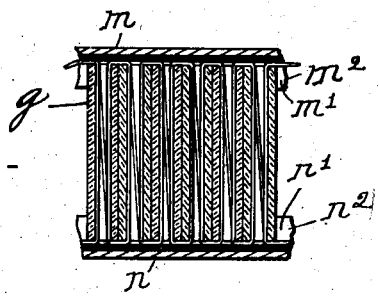
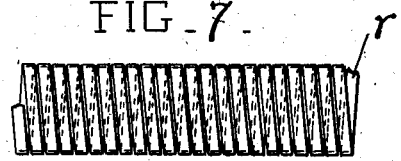
Witnesses:
H. B. Davis
M. and M. Piper
FIG. 8.
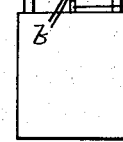
Inventor:
Wm. J. Morrison
by Boyer & Hamman
Attys

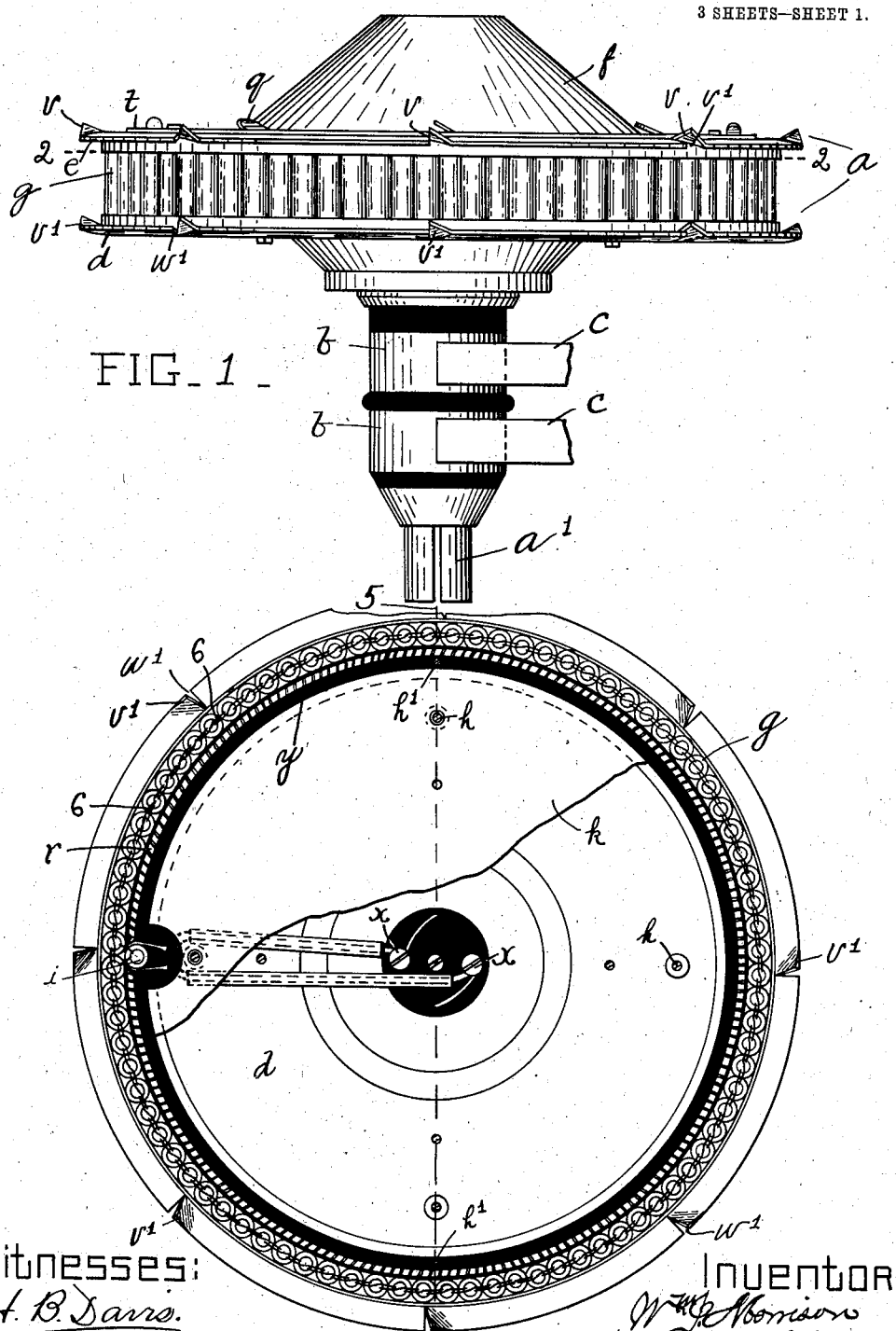

UNITED STATES PATENT OFFICE.

WILLIAM J. MORRISON, OF NASHVILLE, TENNESSEE, ASSIGNOR TO ELECTRIC CANDY MACHINE COMPANY, OF NASHVILLE, TENNESSEE, A CORPORATION OF TENNESSEE.

CANDY-MACHINE.

No. 816,114.      Specification of Letters Patent.      Patented March 27, 1906.

Application filed November 4, 1904. Serial No. 231,349.

*To all whom it may concern:*

Be it known that I, WILLIAM J. MORRISON, of Nashville, county of Davidson, State of Tennessee, have invented an Improvement in Candy-Machines, of which the following description, in connection with the accompanying drawings, is a specification, like characters on the drawings representing like parts.

This invention relates to certain improvements in that class of candy-machines which are adapted to convert ordinary granulated sugar into finely-attenuated threads, and more particularly it relates to certain improvements in the device shown in the United States Patent to myself and John C. Wharton, No. 717,756, of January 6, 1903. The device of said prior patent is defective in various particulars, several of the more important of which are as follows: In said prior device a satisfactory means was not provided to prevent the discharge of grains of unmelted sugar with the melted sugar which it is alone desired to discharge. With said device, moreover, it was difficult to prevent overheating of the sugar, and it is a fact that in order to secure desirable results, such as uniformity and fineness of the product, the sugar must be thrown from the rotating container or vessel at a temperature which but slightly exceeds the melting-point of sugar and that if this temperature is exceeded the product will not be delivered in threads of the desired uniform fineness and the syrup is liable to turn to caramel and clog or close the discharge-opening from the vessel. In said prior device the electric heater is more or less exposed to the open air, causing the waste of heat to a very material extent. From a long series of experiments I have reached the conclusion that a form of heater which consists of a series of closely-arranged coils, folds, or plaits is better adapted for this purpose than any other form of which I am aware, and with such a form of heater as the number of heating-sections in a given space is liable to vary somewhat from those in an adjacent space it follows that the sugar or syrup may be heated to a higher temperature at some points than at others, thereby preventing uniform results from being secured and frequently causing more or less of the sugar to turn to caramel. With said prior device, moreover, much difficulty has arisen from arcing and short-circuiting of the heater, caused by imperfect insulation thereof, the sugar being thereby burned or overheated. While the threads of sugar will ordinarily be thrown or carried to the sides of the collecting-receptacle in which the vessel rotates, yet it has quite frequently happened that conditions have arisen which have caused the threads to be wound upon the vessel instead, necessitating frequent clearing of the discharge-passage of the vessel at its end.

My invention has for its object to provide a device of the character above described with means which shall effectively prevent the escape of the grains of sugar before they are melted and which shall thoroughly strain the discharged syrup and deliver the same in uniform threads or ribbons.

A further object of my invention is to prevent contact of the outer air with the electric heater, so as to reduce the amount of heat lost by radiation and to provide a suitable insulating-support therefor.

A further object of my invention is to prevent any portion of the syrup from being raised to too high a temperature and to provide means whereby the syrup may be discharged practically as rapidly as it is formed.

A further object of my invention is to provide means for assisting the centrifugal action of the vessel in forcing the syrup therefrom as fast as it is formed and in conveying the fine threads to the sides of the collecting-receptacle to prevent them from being wound about the vessel after they have been discharged.

I accomplish these objects by the means shown in the accompanying drawings, in which—

Figure 1 represents a side elevation of a rotatable vessel or casing provided with my invention. Fig. 2 is a plan view taken on the line 2 2 of Fig. 1. Fig. 3 is a top plan view of the casing. Fig. 4 is a detail front view partly broken away. Fig. 5 is a central section on the line 5 5 of Fig. 2. Fig. 6 is an enlarged section on the line 6 6 of Fig. 2. Fig. 7 is a detailed view of a section of the resistance-band. Fig. 8 is an elevation, partly in section, of the whole apparatus.

The hollow casing or vessel $a$ is mounted in a collecting-receptacle $a^0$ upon a vertical shaft $a^2$, which is preferably secured to an armature-shaft of an electric motor, and said shaft $a^2$ is provided with contact-rings $b$, suitably insulated from each other, the electric current being conducted to and from said rings by brushes $c$. The vessel $a$ comprises a base-plate $d$, which is secured to said shaft $a'$, and a cap-plate $e$, which is connected thereto by clamping-bolts $h$, said plate $e$ being provided with a central aperture, into which an inverted funnel $f$ leads, as is in said prior device. Two rings $m$ and $n$ are respectively arranged on the under side of plate $e$ and upper side of plate $d$, said rings being respectively provided with annular grooves $m'$ $n'$, the outer sides of which are formed by oppositely-extending circumferential flanges $m^2$ $n^2$. Fitted in and seated against the bottoms of said grooves $m'$ $n'$ are a series of cylindrical rods $g$, preferably of tubular glass and of equal length. Said rods are arranged closely together side by side, and the rings $m$ $n$ are firmly clamped against the ends of said tubes by bolts $h'$, so that there is no space or opening therebetween. Said rods or tubes $g$ are arranged closely side by side and may be bound together with wire for convenience after the manner illustrated in Fig. 6. While said rods $g$ are so arranged that the spaces between their sides are very narrow and will prevent the passage of solid matter even smaller than the finest grains of granulated sugar therebetween, yet said spaces are sufficiently wide to permit liquid to pass therethrough, so that said tubes unite to form a strainer.

Within the series of rods $g$ is arranged a suitable highly-resistive electrical conductor $r$, the form which I prefer to employ being made by helically winding a flat resistance-wire, with the edges of the coils nearly touching and then pressing the same into a flat band. The band thus formed may be defined as composed of two contiguously-arranged series of straight flat sections, the respective sections of each series having their edges closely adjacent, but out of contact, the ends of each section of one series being respectively connected to the ends of a section of the other series and the sections of each series respectively extending in parallelism transversely of the band at a corresponding but opposite angle of obliquity.

An insulating-tube $i$, of glass or other suitable material, is connected to the inner side of the wall of the strainer, and the ends of the band $r$ terminate at opposite sides thereof. The ends of the wire of which said band is composed are connected to binding-posts $x$, which are in turn connected to the rings $b$, said connecting-wires preferably passing through and being located below an insulating false bottom $k$, as shown in Figs. 4 and 5. The side of said band $r$ preferably lies against the inner side of the wall formed by the series of rods $g$, and the inner sides of the rings $m$ $n$ adjacent the edges of said band are either covered with an insulating enamel or flat rings $y$, of mica or other suitable insulating material, are provided thereon.

The upper ring $m$ is provided with an annular air-chamber $m^3$ at the inner side of its groove $m'$. A series of ports $p$ are provided in upper plate $e$, and inclined blades $q$ are connected to said plate at corresponding sides of said ports. The side of said chamber $m^3$, which bears against the strainer-rods $g$, is provided with perforations or slots $s$, as shown in Figs. 3 and 4. A flat ring or damper $t$ is arranged on the upper plate and adapted to vary the size of the passage through ports $p$.

The edge portions of the upper and lower plates $d$ and $e$, which project beyond the outer side of the strainer-wall $g$, are each provided with a series of obliquely-disposed blades $v$ $v'$, arranged adjacent corresponding notches $w$ $w'$ in said edge portions.

The operation of the above-described device is as follows: The vessel is rotated at a high rate of speed and the granulated sugar is poured into the hopper $f$ and is carried by centrifugal force against the heating band or coil $r$. The sugar is heated and passes between the coils of wire and against the inner sides of the strainer of glass tubes or rods $g$. As the sugar reaches the melting-point the whirling motion will spread the syrup thus formed over the inner surface of the strainer in a film and will force the syrup through the spaces between the rods $g$, thereby causing the sugar to be drawn into fine threads or ribbons as it is thrown off. The rods $g$ become heated to the temperature of the sugar as it is discharged, and as the syrup flows circularly on the inner face of the strainer a tendency to overheat the sugar at a particular section of the heater by reason of there being a greater number of coils therein than in another section is in a great measure counteracted. This is a highly-important feature of my invention, for I am thereby practically enabled to prevent the sugar from being overheated and to discharge the sugar while at the melting-point, approximately, and as soon as possible after it is melted. The strainer of closely-arranged glass cylinders not only effectively prevents the escape of all unmelted grains of sugar and thoroughly strains the melted sugar, but it also acts as a perfect insulating transverse support for the heater and prevents in a large degree the radiation of heat from the heater while the apparatus is being rotated. The vessel is rotated in such a direction with relation to the position of the blades $q$ (indicated by the arrow in Fig. 3) that they will cause air to be forced into the air-chamber $m^3$ and out through the ports $s$ therein against the inner side of the strainer-wall, thus producing an air-pressure against the film of liquid sugar thereon and greatly facilitating the rapidity of its discharge through the strainer and also materially aiding in carrying the threads of sugar to the sdies of the collecting-receptacle $a^0$. The circumferential blades $v$ $v'$ are so disposed that they cause the air to be forced transversely of the strainer and also partly radially of the vessel $a$—that is, they drive the air obliquely downward across the direction of discharge into and toward the side walls of the collecting-receptacle $a^0$, so that the threads of sugar will be effectively cleared from the rotating vessel and prevented from being wound thereon and will be delivered to the receptacle $a^0$ in the desired manner. The lower blades $v'$ simply supplement the action of the upper blades $v$ and may be omitted.

The particular form of resistance-band or retaining-heater screen illustrated is especially advantageous when used in this connection, for the reason that it intercepts a large proportion of the grains of sugar and melts them before they reach the strainer, the sections thereof permitting the ready passage of the sugar therebetween as fast as it is melted, and, moreover, enables all of the sections of the band to be held in such close proximity to the strainer that the melting action is concentrated close to the point of discharge.

Various changes for the above-described construction may be made without departing from the spirit and scope of my invention.

Having thus described my invention, what I claim as new, and desire to secure by Letters Patent, is—

1. A device of the character described, comprising a rotatable vessel having a circumferential strainer composed of a series of contiguously-arranged bodies, and an electrically-heated conductor arranged adjacent said strainer, substantially as described.

2. A device of the character described comprising a rotatable casing having a circumferential strainer composed of a circular series of contiguously-arranged rods, and an electrically-heated conductor arranged within said casing, adjacent said series of rods, substantially as described.

3. A device of the character described comprising a rotatable casing having a circumferential strainer composed of a circular series of contiguously-arranged rods of insulating material, and an electrically-heated conductor arranged within said casing, adjacent said series of rods, substantially as described.

4. A device of the character described, comprising a rotatable casing having circular top and bottom sections arranged transversely of the axis thereof, a circular series of contiguously-arranged, axially-extending rods forming a strainer, means for clamping said sections against the ends of said rods, and means for heating the contents of said casing, substantially as described.

5. A device of the character described, comprising a rotatable casing having circular top and bottom sections, said sections having annular faces on their adjacent sides, and circumferential ribs extending toward each other from the outer edges of said faces, a series of rods of equal length, contiguously arranged side by side against said ribs and having their ends bearing against said faces, means for clamping said sections together, and a circularly-arranged heater between said sections and within said series of rods, substantially as described.

6. The combination of a rotatable vessel having a circumferential discharge-passage and an air-inlet passage, an air-deflecting blade mounted on said vessel adjacent said air-inlet passage and disposed to force air therethrough into said vessel as it is rotated, substantially as described.

7. A device of the character described comprising the rotatable vessel having a circumferential discharge-strainer, an annular air-chamber having discharge-ports leading to the inner side of the strainer, and means without the vessel for forcing air into said chamber, substantially as described.

8. The combination of a rotatable vessel having a circumferential discharge-passage and means for raising the air-pressure in said vessel to facilitate the discharge therefrom, comprising an air-chamber having inlet-ports leading to one side of said vessel, and discharge-ports leading to the interior of said vessel, adjacent its discharge-passage, and air-deflecting blades arranged adjacent said inlet-ports, substantially as described.

9. A device of the character described, comprising a rotatable vessel having a cylindrical perforated side wall arranged axially thereof and forming a strainer, and an electrically-heated, cylindrically-shaped band lying against the inner side of said wall, substantially as described.

10. A device of the character described, comprising a rotatable vessel having a circumferential discharge-passage and means for forcing air transversely of the discharge end of said passage while the vessel is rotated, substantially as described.

11. A device of the character described comprising a rotatable vessel having a circumferential discharge-passage, and blades on said vessel for forcing air transversely of the discharge end of said passage while the vessel is rotated, substantially as described.

12. A device of the character described comprising a vessel rotatable about a vertical axis, a collecting-receptacle in which said vessel is mounted, obliquely-disposed blades, circumferentially mounted on said vessel directly above the outer end of said passage, for forcing air transversely of said passage downwardly into said receptacle, substantially as described.

In testimony whereof I have signed my name to this specification in the presence of two subscribing witnesses.

WM. J. MORRISON.

Witnesses:
 LOUIS H. HARRIMAN,
 H. B. DAVIS.